United States Patent
Wunsch et al.

(10) Patent No.: US 11,754,476 B2
(45) Date of Patent: *Sep. 12, 2023

(54) MICROSCALE AND MESOSCALE CONDENSER DEVICES

(71) Applicant: International Business Machines Corporation, Armonk, NY (US)

(72) Inventors: Benjamin H. Wunsch, Mt. Kisco, NY (US); Joshua T. Smith, Croton on Hudson, NY (US); Sung-Cheol Kim, Croton on Hudson, NY (US); Stacey M. Gifford, Fairfield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,635

(22) Filed: Dec. 5, 2022

(65) Prior Publication Data

US 2023/0097357 A1    Mar. 30, 2023

Related U.S. Application Data

(60) Continuation of application No. 17/227,522, filed on Apr. 12, 2021, now Pat. No. 11,566,982, which is a
(Continued)

(51) Int. Cl.
*G01N 1/40* (2006.01)
*B01D 29/44* (2006.01)
*B01L 3/00* (2006.01)

(52) U.S. Cl.
CPC ........... *G01N 1/4077* (2013.01); *B01D 29/44* (2013.01); *B01L 3/502746* (2013.01);
(Continued)

(58) Field of Classification Search
CPC ..... B01L 2200/0631; B01L 2200/0636; B01L 2200/0652; B01L 2300/0858;
(Continued)

(56) References Cited

U.S. PATENT DOCUMENTS 8,021,614 B2   9/2011   Huang et al.
8,906,322 B2   12/2014  Huang et al.
(Continued)

FOREIGN PATENT DOCUMENTS

CN    101217118 A    7/2008
CN    101340836 A    1/2009
(Continued)

OTHER PUBLICATIONS

Notice of Allowance received for U.S. Appl. No. 17/227,522 dated Dec. 23, 2022, 7 pages.
(Continued)

*Primary Examiner* — Harshad R Patel
*Assistant Examiner* — Truong D Phan
(74) *Attorney, Agent, or Firm* — Amin, Turocy & Watson, LLP

(57) ABSTRACT

Microscale and/or mesoscale condenser arrays that can facilitate microfluidic separation and/or purification of mesoscale and/or nanoscale particles and methods of operation are described herein. An apparatus comprises a condenser array comprising pillars arranged in a plurality of columns, wherein a pillar gap greater than or equal to about 0.5 micrometers is located between a first pillar of the pillars in a first column of the columns and a second pillar of the plurality of pillars in the first column, and wherein the first pillar is adjacent to the second pillar. The first ratio can be characterized by $D_x/D_y$ is less than or equal to a first defined value, wherein $D_x$ represents a first distance across the lattice in a first direction, wherein $D_y$ represents a second distance
(Continued)

across the lattice in a second direction, and wherein the first direction is orthogonal to the second direction.

20 Claims, 10 Drawing Sheets

Related U.S. Application Data division of application No. 15/875,862, filed on Jan. 19, 2018, now abandoned.

(52) U.S. Cl.
CPC . *B01L 3/502761* (2013.01); *B01L 2200/0647* (2013.01); *B01L 2200/0652* (2013.01); *B01L 2300/0858* (2013.01); *B01L 2400/086* (2013.01)

(58) Field of Classification Search
CPC ....... B01L 2300/0861; B01L 2300/089; B01L 3/00; B01L 3/502753; B01L 2200/0647; B01L 2300/0809; B01L 2300/0816; B01L 2300/0864; B01L 2300/1894; G01N 1/34; G01N 15/06; G01N 33/00; G01N 33/48; G01N 35/00; G01N 1/4077
See application file for complete search history.

(56) References Cited

U.S. PATENT DOCUMENTS

| | | | |
|---|---|---|---|
| 9,636,675 B2 | 5/2017 | Astier et al. | |
| 9,700,891 B2 | 7/2017 | Smith et al. | |
| 9,835,538 B2 | 12/2017 | Astier et al. | |
| 10,324,011 B2 | 6/2019 | D'Silva et al. | |
| 11,566,982 B2 * | 1/2023 | Wunsch | B01L 3/502761 |
| 2006/0144076 A1 | 7/2006 | Daddis et al. | |
| 2007/0020496 A1 | 1/2007 | Pelton et al. | |
| 2009/0212407 A1 | 8/2009 | Foster et al. | |
| 2010/0059414 A1 | 3/2010 | Sturm et al. | |
| 2010/0200992 A1 | 8/2010 | Purushothaman et al. | |
| 2012/0037544 A1 | 2/2012 | Lane et al. | |
| 2013/0168298 A1 | 7/2013 | Huang et al. | |
| 2014/0154703 A1 | 6/2014 | Skelley et al. | |
| 2015/0054149 A1 | 2/2015 | Purushothaman et al. | |
| 2015/0064153 A1 | 3/2015 | Civin et al. | |
| 2015/0190804 A1 | 7/2015 | Pesaturo et al. | |
| 2016/0047735 A1 | 2/2016 | Grisham et al. | |
| 2016/0061811 A1 | 3/2016 | Kelley et al. | |
| 2016/0121331 A1 | 5/2016 | Kapur et al. | |
| 2016/0139012 A1 | 5/2016 | D'Silva et al. | |
| 2016/0144361 A1 | 5/2016 | Astier et al. | |
| 2016/0144405 A1 | 5/2016 | Astier et al. | |
| 2016/0144406 A1 | 5/2016 | Astier et al. | |
| 2016/0146717 A1 | 5/2016 | Astier et al. | |
| 2016/0146718 A1 | 5/2016 | Astier et al. | |
| 2016/0244714 A1 | 8/2016 | Spuhler et al. | |
| 2017/0248508 A1 * | 8/2017 | Ward | B01L 3/502753 |
| 2017/0312747 A1 | 11/2017 | Hu et al. | |
| 2018/0078939 A1 | 3/2018 | Hu et al. | |
| 2018/0080060 A1 | 3/2018 | Gifford et al. | |
| 2018/0080857 A1 | 3/2018 | Gifford et al. | |
| 2019/0126278 A1 | 5/2019 | Arai | |
| 2019/0224677 A1 | 7/2019 | Smith et al. | |
| 2019/0226953 A1 | 7/2019 | Wunsch et al. | |
| 2020/0038861 A1 | 2/2020 | Yoon et al. | |
| 2020/0122144 A1 | 4/2020 | Smith et al. | |
| 2020/0139370 A1 | 5/2020 | Kapur et al. | |

FOREIGN PATENT DOCUMENTS

| | | |
|---|---|---|
| CN | 102052803 A | 5/2011 |
| CN | 102856329 A | 1/2013 |
| CN | 105050718 A | 11/2015 |
| CN | 105161473 A | 12/2015 |
| CN | 105293428 A | 2/2016 |
| CN | 105745021 A | 7/2016 |
| CN | 107110765 A | 8/2017 |
| EP | 2 119 503 A2 | 11/2009 |
| JP | H-0926283 A | 1/1997 |
| JP | 2008-538282 A | 10/2008 |
| JP | 2008-538283 A | 10/2008 |
| JP | 2017-536824 A | 12/2017 |
| WO | 2017/087940 A1 | 5/2017 |
| WO | 2017/221898 A1 | 12/2017 |

OTHER PUBLICATIONS

Notice of Reasons for Refusal received for Japanese Patent Application Serial No. 2020-538856 dated Jan. 10, 2023, 6 pages (Including English Translation).
Chinese Office Action for Chinese Application Serial No. 201980008769.9 dated Feb. 12, 2023.
U.S. Appl. No. 17/227,522, filed Apr. 12, 2021.
U.S. Appl. No. 15/875,862, filed Jan. 19, 2018.
Smith et al., "Microfluidic Devices With Multiple Inlets and Outlets" U.S. Appl. No. 16/168,330, filed Oct. 23, 2018, 39 pages.
Smith et al., "Microfluidic Chips With One or More Vias Filled With Sacrificial Plugs" U.S. Appl. No. 16/168,292, filed Oct. 23, 2018, 17 pages.
Zhao et al., "Microfluidic Techniques for Analytes Concentration", Micromachines, vol. 8, No. 28, Jan. 22, 2017, 32 Pages.
Salafi et al., "Advancements in micrafluidics for nanoparticle separation", Lab on a Chip, vol. 17, No. 11, Oct. 26, 2016, pp. 11-33.
Wunsch et al., "Nanoscale lateral displacement arrays for the separation of exosomes and colloids down to 20 nm", Nature Nanotechnology, vol. 11, Aug. 1, 2016, pp. 936-940.
Contreras-Naranjo et al., "Micrafluidics for exosome isolation and analysis: enabling liquid biopsy for personalized medicine", Lab on a Chip, vol. 17, No. 21, Aug. 7, 2017, pp. 3558-3577.
Woo et al., "Exodisc for rapid, size-selective, and efficient isolation and analysis of nanoscale extracellular vesicles from biological samples", ACS Nano, vol. 11, No. 2, Jan. 9, 2017, pp. 1360-1370.
Liu et al., "Field-free isolation of exosomes from extracellular vesicles by microfluidic viscoelastic flows", ACS Nano, vol. 11, No. 7, Jul. 5, 2017, pp. 6968-6976.
Liu et al., "The exosome total isolation chip", ACS Nano, vol. 11, Nov. 1, 2107, pp. 10712-10723.
Kim et al., "Broken flow symmetry explains the dynamics of small particles in deterministic lateral displacement arrays", PNAS, vol. 114, No. 26, Jun. 12, 2017, pp. E5034-E5041.
Loutherback et al., "Improved performance of deterministic lateral displacement arrays with triangular posts", Microfluid Nanofluid, vol. 9, May 12, 2010, pp. 1143-1149.
Laki, et al., "Microvesicle fractionation using deterministic lateral displacement effect", Proceedings of the 9th IEEE International Conference on Nano/Micro Engineered and Molecular Systems (NEMS), Apr. 13, 2014, pp. 490-493.
Laki, et al., "Separation of Microvesicles from Serological Samples Using Deterministic Lateral Displacement Effect", BioNanoScience, vol. 5, No. 1, 2015, pp. 48-54.
Tran, et al., "Open channel deterministic lateral displacement for particle and cell sorting", Lab on a Chip, vol. 17, No. 21, Sep. 18, 2107, pp. 3592-3600.
Yuan, et al., "On-Chip Microparticle and Cell Washing Using Coflow of Viscoelastic Fluid and Newtonian Fluid", Analytical Chemistry, Aug. 8, 2007, 10 Pages.
Wang, et al., "Ciliated micropillars for the microfluidic-based isolation of nanoscale lipid vesicles", Lab on a Chip, vol. 13, May 7, 2003, pp. 2879-2882.
Sehgal, et al., "Separation of 300-nm and 100-nm particles in Fabry-Perot acoustofluidic resonators", Analytical Chemistry, vol. 89, Oct. 17, 2017, pp. 12192-12200.
Kanwar, et al., "Microfluidic device (ExoChip) for on-chip isolation, quantification and characterization of circulating exosomes". Lab on a Chip, vol. 14, Mar. 14, 2014, pp. 1891-1900.

(56) References Cited

OTHER PUBLICATIONS

Ibsen, et al., "Rapid isolation and detection of exosomes and associated biomarkers from plasma", ACS Nano, vol. 11, Jul. 3, 2107, pp. 6641-6651.
Nge, et al., "Advances in microfluidic materials, functions, integration, and applications", Chemical Reviews, vol. 113, Feb. 14, 2013, pp. 2550-2583.
McDonald, et al., "Fabrication of microfluidic systems in poly(dimethylsiloxane)", Electrophoresis, vol. 21, 2000, pp. 27-40.
Wu, et al., "Isolation of exosomes from whole blood by integrating acoustics and microfluidics", PNAS, vol. 114, No. 10, Oct. 3, 2017, pp. 10584-10589.
Dang, et al., "Integrated Microfluidic Cooling and Interconnects for 2D and 3D Chip", IEEE Transactions on Advanced Packaging, vol. 33. No. 1, Feb. 2010, pp. 79-87.
List of IBM Patents or Applications Treated as Related.
International Search Report and Written Opinion received for PCT Application Serial No. PCT/IB2019/050271 dated Feb. 28, 2019, 9 pages.
International Search Report and Written Opinion received for PCT Application Serial No. PCT/IB2019/050272 dated Mar. 27, 2019, 10 pages.
International Search Report and Written Opinion received for PCT Application Serial No. PCT/IB2019/050273 dated Apr. 8, 2019, 9 pages.
Non-Final Office Action received for U.S. Appl. No. 15/875,940 dated Jun. 12, 2020, 33 pages.
Non-Final Office Action received for U.S. Appl. No. 15/875,905 dated May 15, 2020, 42 pages.
Non-Final Office Action received for U.S. Appl. No. 15/875,862 dated Sep. 18, 2020, 48 pages.
Final Office Action received for U.S. Appl. No. 15/875,940 dated Nov. 19, 2020, 14 pages.
Appendix P citing IBMP328USA.
Non-Final Office Action received for U.S. Appl. No. 15/875,940 dated Feb. 11, 2021, 10 pages.
Non-Final Office Action received for U.S. Appl. No. 15/875,862 dated Dec. 31, 2020, 40 pages.
Final Office Action received for U.S. Appl. No. 15/875,940 dated Jul. 13, 2021, 18 pages.
Office Action received for G.B. Patent Application Serial No. 2010161.4 dated Nov. 4, 2021, 5 pages.
Non-Final Office Action received for U.S. Appl. No. 15/875,940 dated Jan. 19, 2022, 14 pages.
Office Action received for G.B. Patent Application Serial No. 2010161.4 dated Jan. 19, 2022, 3 pages.
Office Action received for G.B. Patent Application Serial No. 2010486.5 dated Jan. 24, 2022, 4 pages.
Office Action received for G.B. Patent Application Serial No. 2011413.8 dated Feb. 22, 2022, 4 pages.
Notice of Reasons for Refusal received for J.P. Patent Application Serial No. 2020-538794 dated Apr. 26, 2022, 10 pages.
Notice of Reasons for Refusal received for J.P. Patent Application Serial No. 2020-538856 dated May 10, 2022, 6 pages.
Examination Report under Section 18(3) received for GB Patent Application Serial No. GB2010486.5 dated Aug. 11, 2022, 5 pages.
Notice of Reasons for Refusal received for Japanese Patent Application Serial No. 2020-538794 dated Nov. 15, 2022, 10 pages (Including English Translation).
Office Action received for Chinese Application Serial No. 201980008710.X dated Feb. 23, 2023, 7 pages (Original Copy only).
Office Action received for Chinese Application Serial No. 201980007753.6 dated Feb. 25, 2023, 7 pages (Original Copy only).
Non-Final Office Action received for U.S. Appl. No. 17/132,849 dated Mar. 31, 2023, 69 pages.

* cited by examiner

MICROSCALE AND MESOSCALE CONDENSER DEVICES

BACKGROUND

The subject disclosure relates to microscale and/or mesoscale condenser devices, and more specifically to microscale and/or mesoscale condenser arrays that can facilitate microfluidic separation and/or purification of mesoscale and/or nanoscale particles.

The ability to purify particles (e.g., colloids) can be very important for practical applications and analysis of nanomaterials. Nowhere is this more vital than in biology and medicine, where bio-colloids ranging from proteins, vesicles and organelles, constitute the molecular building blocks of all living things. Purification can inevitably comprise a spatial requirement: desired colloids can be transferred to a specific space, thereby removing them from other contaminates and undesired species. Much of nanotechnology and biotechnology has been concerned with purification techniques, including gel electrophoresis, chromatography, centrifugation, affinity binding and molecular sieving. In all of these techniques, energy is expended to physically transfer a colloidal species from a mixture into a non-contaminated solvent, effecting purification.

Despite the successes of established purification techniques, the emerging field of lab-on-a-chip and/or microfluidic technologies has posed a challenge to these classical methods. The need to purify small quantities of sample rapidly and precisely on chip, particularly for rare samples or remote locations, has negated many of the previous advantages of colloidal purification technologies, such as centrifugation and/or affinity methods, which can require large machinery or fragile chemistries to operate. New technologies, based on periodic nanostructures or "metamaterials" have proven effective for on-chip purification systems, one example being microscale and nanoscale deterministic lateral displacement ("nanoDLD"), which uses asymmetric mesoscale pillar arrays to laterally displace jets of colloid mixtures into size-sorted streams. A variation on this method, termed nanoscale condenser arrays ("nCA"), produces lateral splitting of colloid mixtures in a flowing stream using manipulation of the fluid flow itself, producing a nearly size-agnostic method of displacing particles.

Despite the advantage of on-chip metamaterial approaches such as nanoDLD and nCA, there remains an issue of throughput. Techniques such as nanoDLD and nCA have extremely low flow rates (e.g. <1 nanoliter per hour (nL/hr)) owing to nanoscale dimensional confinement effects on fluid flow, and on-chip electrophoresis methods produce no appreciable mass flow, making the preparation of samples from on-chip technologies highly impractical. This leaves an unsatisfied space in lab-on-a-chip technology, in which chips can process samples but cannot render enough of the product for further analysis (e.g., either on-chip or off-chip).

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, apparatuses and/or methods regarding to microscale and/or mesoscale condenser arrays that can facilitate microfluidic separation and/or purification of mesoscale and/or nanoscale particles are described.

According to an embodiment, an apparatus is provided. The apparatus can comprise a condenser array, which can comprise a plurality of pillars, and the plurality of pillars can be arranged in a plurality of columns. A pillar gap greater than or equal to about 0.5 micrometers can be located between a first pillar of the plurality of pillars in a first column of the plurality of columns and a second pillar of the plurality of pillars in the first column. Also, the first pillar can be adjacent to the second pillar. Additionally, in one or more optional embodiments, the plurality of pillars can define a lattice that laterally displaces a fluid flowing through the condenser array.

According to another embodiment, a method is provided. The method can comprise receiving a fluid at a microchannel comprising a condenser array. The method can also comprise displacing, by the condenser array, a particle from the fluid in a direction lateral to a side wall of the microchannel. Further, the method can comprise outputting the particle from the microchannel at a rate greater than about 1.0 nanoliters per hour. Additionally, in one or more embodiments, the condenser array can comprise a plurality of pillars that can define a lattice that can laterally displace the fluid as the fluid flows through the condenser array.

According to another embodiment, another method is provided. The method can comprise receiving a sample fluid and a solvent fluid at a microchannel comprising a condenser array. The method can also comprise displacing, by the condenser array, a sample from the sample fluid in a direction lateral to a side wall of the microchannel, wherein the sample can be displaced into the solvent fluid. Further, the method can comprise outputting the sample from the microchannel at a rate greater than about 1.0 nanoliters per hour. Additionally, in one or more optional embodiments, the condenser array can comprise a plurality of pillars, which can define a lattice that can laterally displace the sample as the sample fluid flows through the condenser array.

Thus, various embodiments described herein can regard microscale and/or mesoscale condenser array designs, which can: manipulate nanoscale and/or mesoscale particles (e.g., colloids) across a broad size band; and comprise microscale and/or mesoscale fluidic channels (e.g., comprising pores and/or gaps), which can allow higher throughput rates than conventional nanoscale metamaterials. The microscale and/or mesoscale condenser arrays described herein can provide particle (e.g., colloidal purification) while maintaining low fluidic resistances, thereby enabling the ability for a chip to output appreciable fluid flows (e.g., 100-1000+ µL/hr) for low to medium volume preparative applications.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
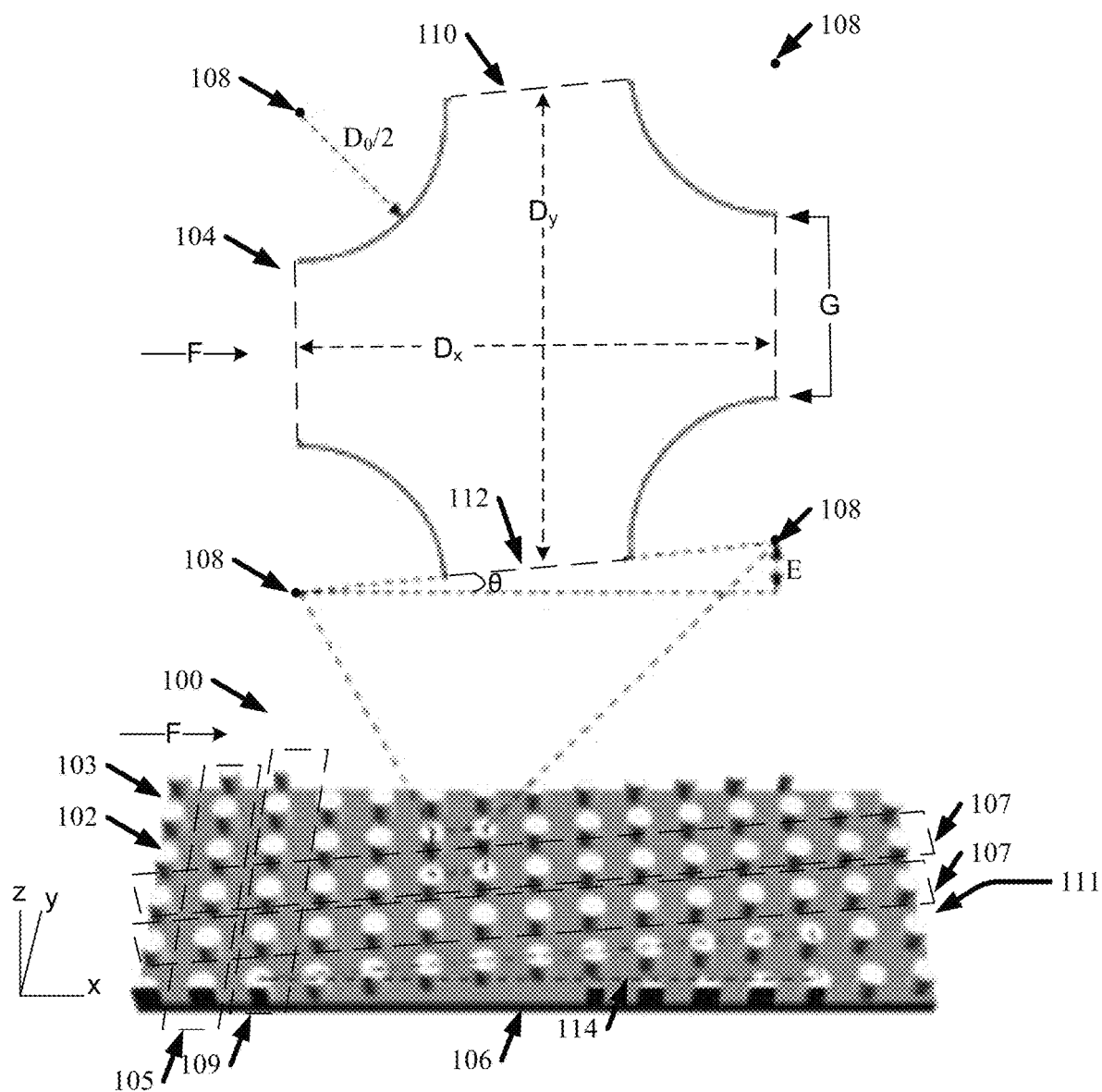
FIG. 1 illustrates a diagram of an example, non-limiting condenser array in accordance with one or more embodiments described herein.

FIG. 1 illustrates a diagram of an example, non-limiting condenser array 100 in accordance with one or more embodiments described herein. The condenser array 100 can be located within a microchannel 103 and can comprise a plurality of pillars 102. The condenser array 100 can operate on a principle of hydrodynamic chaos facilitated by one or more lattice structures 104 defined by the plurality of pillars 102. In various embodiments, the condenser array 100 can be a microscale condenser array and/or a mesoscale condenser array. For example, the condenser array 100 can have one or more geometries on the microscale and/or the mesoscale. As used herein, the term "microscale" can refer to one or more devices, apparatuses, and/or features having one or more characteristic dimensions greater than or equal to 1 micrometer and less than or equal to 999 micrometers. As used herein, the term "mesoscale" can refer to one or more devices, apparatuses, and/or features having one or more characteristic dimensions greater than or equal to 0.1 millimeters and less than or equal to 100 millimeters.

A fluid can flow through the microchannel 103, and thereby the condenser array 100, in a direction indicated by the arrow "F" in FIG. 1. When a fluid flow F is directed through the condenser array 100, the plurality of pillars 102 can act to deflect the fluid itself, causing a minor lateral component to the fluid flow which does not average out over the length of the microchannel 103. A net lateral displacement of the fluid can laterally move one or more particles (e.g., colloids) comprising the fluid; and thereby can affect a spatial displacement or "condensation" within the condenser array 100. The condenser array 100 can concentrate one or more particles (e.g., colloids) into a concentrated stream. Further, the concentrated stream can comprise one or more particles (e.g., colloids) of a particular size and/or one or more particles (e.g., colloids) of various sizes.

Condensing one or more particles (e.g., colloids) of the fluid into a concentrated stream can be useful for concentrating a sample and/or preparing a sample for further separation into streams based on size/chemistry for purification. Since the condenser array 100 can manipulate the fluid flow itself, particles (e.g., colloids) within the fluid, regardless of size, can experience the same lateral displacement. The condensing (e.g., the lateral fluid displacement) that can be achieved by the condenser array 100 can depend on the geometry of the one or more lattice structures 104 and/or the plurality of pillars 102. Previous art has specified the geometry only on the nanoscale (e.g., less than 500 nanometers (nm) for all dimensions). In one or more embodiments described herein, the condenser array 100 can comprise a microscale structure that can still manipulate nano-size particles (e.g., colloids).

As shown in FIG. 1, the plurality of pillars 102 can be arranged in a plurality of columns (e.g., column 105 traversing the microchannel 103 along the "y" axis) and/or a plurality of rows (e.g., row 107 traversing the microchannel 103 along the "x" axis). Additionally, adjacent columns 105, 109 comprising the plurality of pillars 102 can be arranged offset each other (e.g., along the y axis), thereby positioning the plurality of rows at an angle to one or more walls 106 of the microchannel 103. FIG. 1 shows an expanded view of an exemplary lattice structure 104 defined by four pillars (e.g., pillar 102 can be an example of one of the four pillars).

The lattice structure 104 can be defined by four pillars of the plurality of pillars (e.g., where one or more pillars can be as shown at pillar 102). The lattice structure 104 can be located throughout the condenser array 100 and/or at portion of the condenser array 100. Further, the four pillars 102 can be adjacent to each other. For example, two adjacent pillars 102 of a column 105 and two adjacent pillars 102 of a row 107 can define a lattice structure 104, wherein the column 105 and the row 107 can be adjacent to each other. FIG. 1 shows an example of four exemplary pillars 102, which can define a lattice structure 104, with dashed lines. Further, as shown in FIG. 1, dashed lines delineate an expanded view of an exemplary lattice structure 104 defined by the four exemplary pillars 102. One of ordinary skill in the art will recognize, that the condenser array 100 can comprise one or more lattice structures 104 in one or more locations within the microchannel 100 other than the location of the exemplary, expanded lattice structure 104 shown in FIG. 1.

As shown in FIG. 1 "E" can represent a lateral shift between centers 108 of pillars 102 of sequential columns. The lateral shift (e.g., represented by E) between sequential columns of pillars 102 can be characterized by formula 1: $D_y/N$. The lateral shift (e.g., represented by E) of the condenser array 100 can be greater than or equal 0.01 and/or less than or equal to 0.3.

As shown in FIG. 1, "$D_y$" can represent a first distance across the lattice structure 104 along the y axis of the condenser array 100. $D_y$ can extend from a first boundary 110 of the lattice structure 104 to a second boundary 112 of the lattice structure 104. Further, the first boundary 110 can be defined by a first center line of a first row 107 of pillars 102, and the second boundary 112 can be defined by a second center line of a second row 107 of pillars 102; wherein the first row 107 of pillars 102 and the second row 107 of pillars 102 can be adjacent to each other in some embodiments. In some embodiments, $D_y$ can be greater than or equal to 1 μm and/or less than or equal to 100 μm.

As shown in FIG. 1, "N" can represent a number of sequential columns that can be employed to overcome the lateral shift and place two columns in alignment. For example, for the condenser array 100 shown in FIG. 1, N can equal 10 as indicated by the dashed triangle 114, which exemplifies the lateral shift.

Further, as shown in FIG. 1, "$D_x$" can represent a second distance across the lattice structure 104 along the x axis of the condenser array 100. $D_x$ can extend from a third boundary 116 of the lattice structure 104 to a fourth boundary 118 of the lattice structure 104. Further, the third boundary 116 can be defined by a third center line of a first column 105 of pillars 102, and the fourth boundary 118 can be defined by a fourth center line of a second column 105 of pillars 102; wherein the first column 105 of pillars 102 and the second column 105 of pillars 102 can be adjacent to each other. Additionally, $D_y$ can be measured along a first direction (e.g., along the y axis of the condenser array 100) that is orthogonal to a second direction (e.g., along the x axis of the condenser array 100), along which the $D_x$ can be measured. In some embodiments, $D_x$ can be greater than or equal to 1 μm and less than or equal to 100 μm.

Moreover, as shown in FIG. 1 "$D_0$" can represent a diameter of the plurality of pillars 102 defining a subject lattice structure 104. The $D_0$ of the pillars 102 can be greater than or equal to 0.5 μm and/or less than or equal to 99.5 μm. Further, the plurality of pillars 102 can have a height greater than or equal to 1 μm and/or less than or equal to 100 μm. As shown in FIG. 1, "G" can represent a pillar gap between adjacent pillars 102 of the same column 105. The condenser array 100 can have a G of greater than or equal to 0.5 micrometers (μm) and/or less than or equal to 100 μm. Further, as shown in FIG. 1, "θ" can represent an angle respective of a wall 106 of the microchannel 103. The θ can be greater than 0 degrees and less than 90 degrees.

A lattice ratio of the lattice structure 104 can be characterized by formula 2: $D_x/D_y$. The lattice ratio can be greater than 0.1 and/or less than or equal to 1.0 to facilitate operation of the condenser array 100. Additionally, a geometry ratio of the condenser array 100 can be characterized by formula 3: $D_0/D_y$. The geometry ratio can be greater than 0.1 and less than or equal to 1.0 to facilitate operation of the condenser array 100. Additionally, the condenser array 100 can comprise greater than or equal 100 columns of pillars 102 to facilitate operation. For example, the condenser array 100 can have an overall length (e.g., along the x axis) greater than or equal to 0.1 millimeters (mm) and less than or equal to 10 mm. An embodiment of the condenser array 100 comprising one or more of the geometries described herein can facilitate a microscale and/or mesoscale condenser array 100 structures and/or facilitate high throughput rates.

Figure 2:
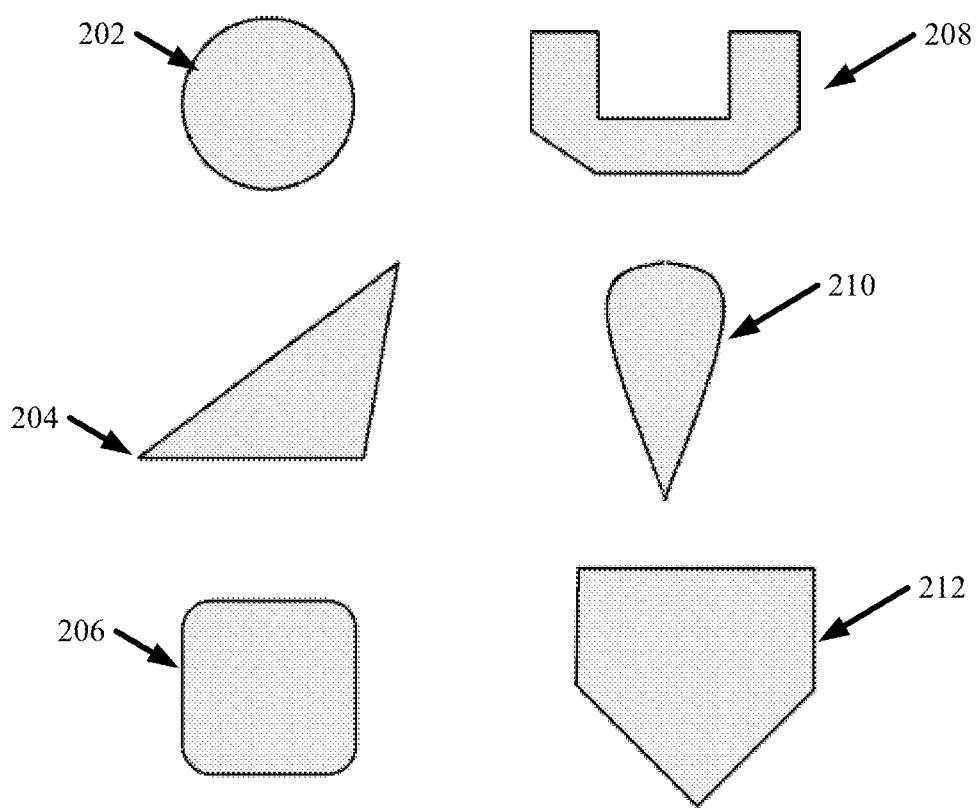
FIG. 2 illustrates a diagram of example, non-limiting pillar shapes that can comprise one or more condenser arrays in accordance with one or more embodiments described herein.

FIG. 2 illustrates a diagram of example, non-limiting shapes of the pillars (e.g., pillar 102) that can comprise the condenser array 100. Repetitive description of like elements employed in other embodiments described herein is omitted for sake of brevity. FIG. 2 shows cross sections of example pillars 102. While FIG. 2 depicts six exemplary shapes, the architecture of the pillars 102 is not so limited. One of ordinary skill in the art will recognize that the pillars (e.g., pillar 102) can be formed as alternative shapes from the ones depicted in FIG. 2 and other geometric dimensions (e.g., regarding the condenser array 100 and/or the lattice structure 104) can be facilitated based on the information described herein. FIG. 2 shows, for example: a circular shape 202, a triangular shape 204, a square shape 206, a U-shape 208, a napiform shape 210, a pentagonal shape 212 (e.g., an irregular pentagon), and/or the like.

Figure 3A:
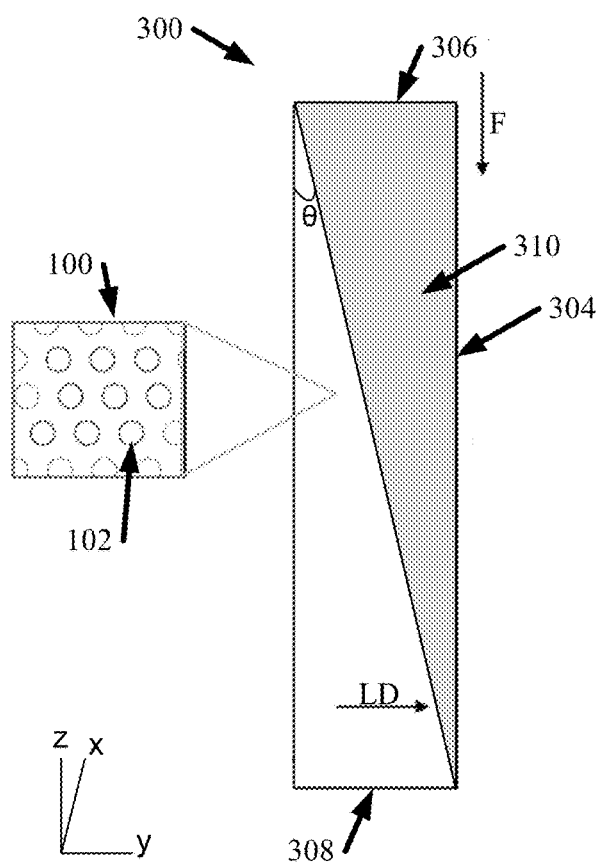
FIG. 3A illustrates a diagram of an example, non-limiting condenser array that can displace one or more particles (e.g., colloids) towards a collection wall in accordance with one or more embodiments described herein.
Figure 3B:
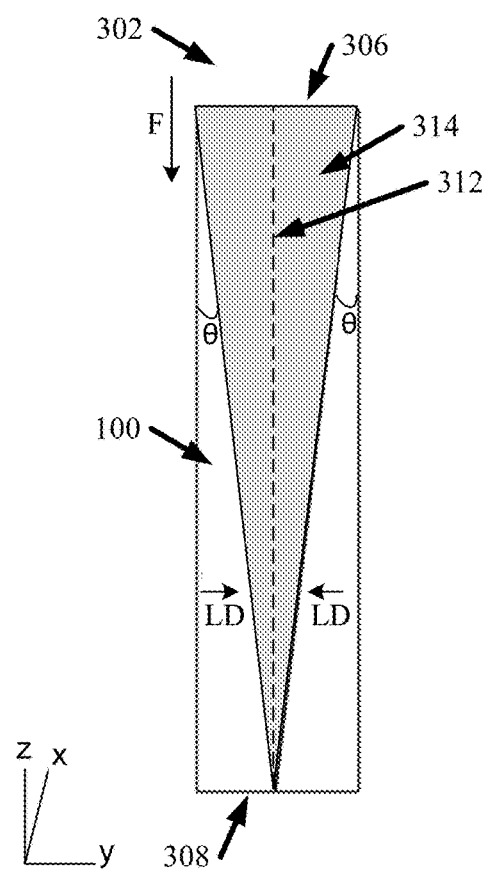
FIG. 3B illustrates a diagram of an example, non-limiting condenser array that can displace one or more particles (e.g., colloids) towards a sub-channel in accordance with one or more embodiments described herein.

FIGS. 3A and 3B illustrate diagrams of example, non-limiting microchannels 300, 302 that can comprise a condenser array 100 in accordance with one or more embodiments described herein. Repetitive description of like elements employed in other embodiments described herein is omitted for sake of brevity. In FIGS. 3A and 3B the condenser array 100 can traverse the entirety of the microchannel 300, 302; however, in one or more embodiments, the condenser array 100 can traverse a portion of the microchannel 300, 302. In some embodiments, one or more of the microchannels 300, 302 can have the structure and/or functionality of microchannel 103.

The lateral shift (e.g., represented by E in FIG. 1) can define the angle (e.g., represented by θ) of the rows of pillars 102 along the axial length (e.g., along the x axis) of the microchannel 300, 302. In turn, the angle (e.g., represented by θ) can defines a lateral displacement direction (e.g., represented by arrow "LD") for the condenser array 100. The lateral displacement direction (e.g., represented by arrow LD) can indicate a direction in which particles (e.g., colloids) are displaced. A fluid can flow (e.g., in a fluid direction indicated by arrow F) through the condenser array 100 at a steady state, which can be affected by an external driving forced that can include, but is not limited to: electro-osmotic flow, pressure driven flow, capillary flow, a combination thereof, and/or the like.

The microchannel 300 shown in FIG. 3A can be a wall-focused microchannel, wherein one or more particles (e.g., colloids) can be displaced in a lateral displacement direction (e.g., indicated by arrow LD) towards a collection wall 304. Further, one or more particles (e.g., colloids) can collect along the collection wall 304, thereby forming a concentrated stream of particles (e.g., colloids). For example, a fluid can be provided to the condenser array 100 via an inlet side 306 of the microchannel 300. The fluid can flow (e.g., in a fluid direction indicated by arrow F) through the condenser array 100 to an outlet side 308 of the microchannel 300, wherein the fluid and/or one or more particles (e.g., colloids) can exit the condenser array 100 and/or the microchannel 300. As the fluid flows though the condenser array 100, particles (e.g., colloids) within the fluid can be displaced (e.g., in a lateral displacement direction indicated by arrow LD) towards the collection wall 304. As particles (e.g., colloids) collect along the collection wall 304, the particles (e.g., colloids) can form a concentrated stream that can exit the condenser array 100 through a portion of the outlet side 308 of the microchannel 300. As shown in FIG. 3A, the flow of particles (e.g., colloids) through the condenser array 100 can be exemplified by a region 310. Thus, microchannel 300 (e.g., a wall-focused microchannel) can comprise a single lateral displacement direction (e.g., indicated by arrow LD), which can push particles (e.g., colloids) against the collection wall 304, effecting condensation of the inlet stream into a concentrated stream.

The microchannel 302 shown in FIG. 3B can be a channel-focused microchannel, wherein the fluid can be displaced in a plurality of lateral directions (e.g., indicated by arrows LD) towards a collection channel 312 (e.g., a sub-channel). Further, one or more particles (e.g., colloids) can collect along the collection channel 312 forming a concentrated stream of particles (e.g., colloids). For example, a fluid can be provided to the condenser array 100 via an inlet side 306 of the microchannel 302. The fluid can flow (e.g., in a fluid direction indicated by arrow F) through the condenser array 100 to an outlet side 308 of the microchannel 302, wherein the fluid and/or one or more particles (e.g., colloids) can exit the condenser array 100 and/or the microchannel 302. As the fluid flows through the condenser array 100, one or more particles (e.g., colloids) can be displaced in a first lateral displacement direction towards the collection channel 312 and one or more other particles (e.g., colloids) can be displaced in a second lateral displacement direction towards the collection channel 312. In other words, one or more lattice structures 104 comprising the condenser array 100 can be configured to displace particles (e.g., colloids) in the first lateral displacement direction, while one or more other lattice structures 104 comprising the condenser array 100 can be configured to displace particles (e.g., colloids) in the second lateral displacement direction.

As particles (e.g., colloids) collect along the collection channel 312 the particles (e.g., colloids) can form a concentrated stream that can exit a portion of the outlet side 308 of the microchannel 302. As shown in FIG. 3B, the flow of particles (e.g., colloids) through the condenser array 100 can be exemplified by a region 314. Thus, microchannel 302 (e.g., a channel-focused microchannel) can comprise a mirror plane with two opposing lateral flows, which can push one or more particles (e.g., colloids) into a single stream within the condenser array 100, termed the collection channel 312.

In various embodiments, the collection channel 312 can be located at any coordinate along the lateral width of the microchannel (e.g., along the y axis) by scaling two sections of the plurality of pillars 102 (e.g., two portions of the condenser array 100). For example, while FIG. 3B shows the collection channel 312 located along the middle of the condenser array 100, in one or more embodiments the collection channel 312 can be located further to the left or right of the exemplary location shown in FIG. 3B. Furthermore, in one or more embodiments the lateral directions (e.g., indicated by arrows LD) can be reflected outward to displace particles (e.g., colloids) against both walls of the microchannel 302.

Figure 4:
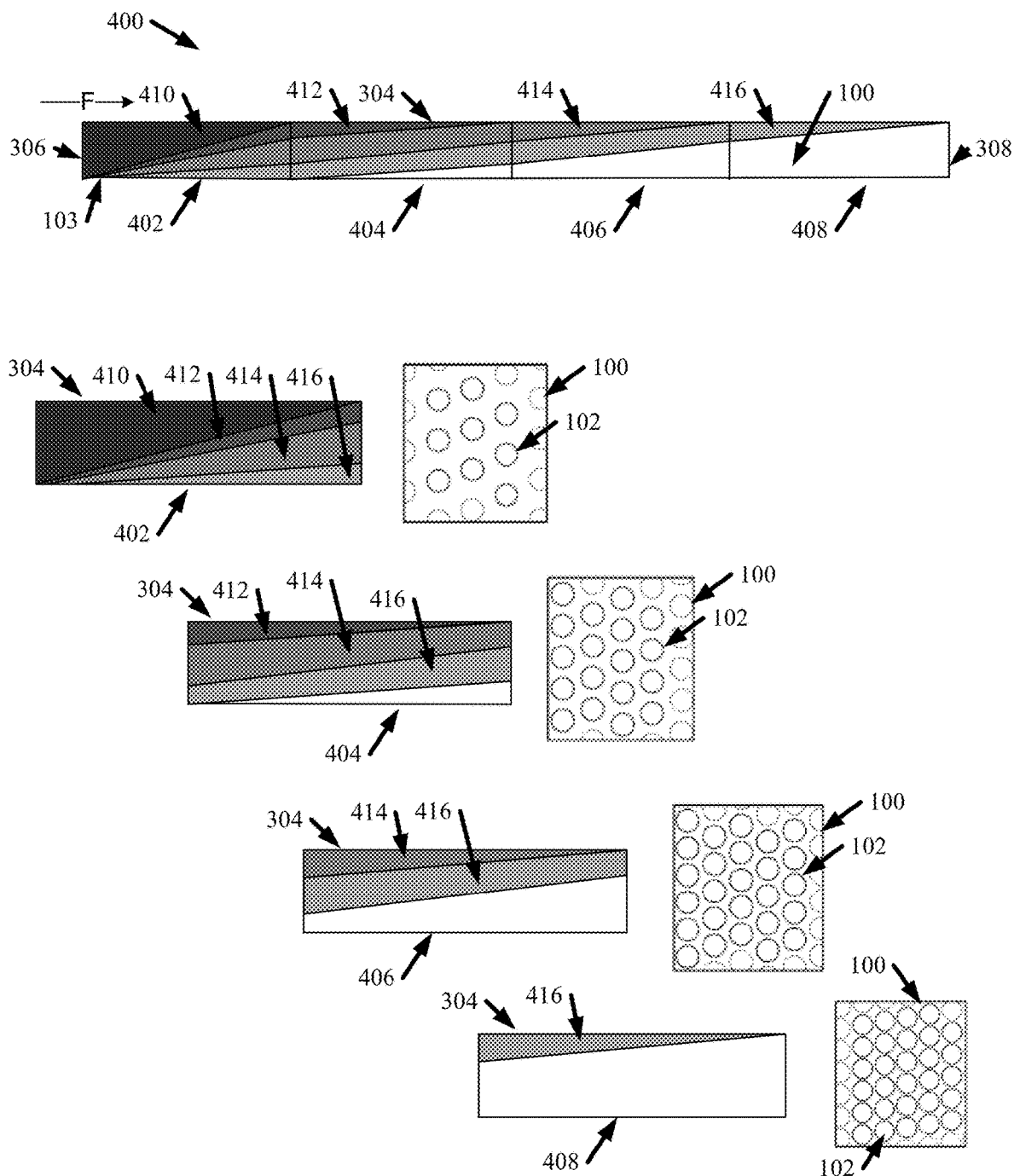
FIG. 4 illustrates a diagram of an example, non-limiting condenser array that can comprise a plurality of stages with varying pillar gaps in accordance with one or more embodiments described herein.

Moreover, the condenser array 100 can comprise uniform geometries and/or varying geometries. For example, FIG. 4 illustrates a diagram of an example, non-limiting microchannel 400 comprising varying condenser array 100 geometries. Repetitive description of like elements employed in other embodiments described herein is omitted for sake of brevity. Microchannel 400 can be interpreted as comprising a condenser array 100 with a plurality of stages having respective geometries or a plurality of adjacent condenser arrays 100 with respective geometries. For sake of simplicity, microchannel 400 is described herein as comprising a condenser array 100 with a plurality of stages, each of which can have different geometries. In some embodiments, one or more of the microchannel 400 can have the structure and/or functionality of microchannels 103, 300, 302.

Fluid can flow through the microchannel 400 from the inlet side 306 to the outlet side 308 (e.g., in a fluid direction indicated by arrow F). As fluid flows through the microchannel 400, the fluid can be manipulated by a condenser array 100. The condenser array 100 can comprise a plurality of stages, such as: a first stage 402, a second stage 404, a third stage 406, and/or a fourth stage 408. While FIG. 4 shows four stages, additional or fewer stages are also envisaged. For example, the condenser array 100 can comprise greater than or equal to 2 stages and less than or equal to any number of required stages such that the hydrodynamic resistance does not impede the required throughput. Each stage of the condenser array 100 can be characterized by different geometries, which can include, but are not limited to: different pillar 102 widths (e.g., represented by $D_0$), different pillar 102 heights, different pillar 102 shapes, different pillar 102 gaps (e.g., represented by G), different lateral shifts (e.g., represented by E), different pillar 102 row angles (e.g., represented by θ), different first distances (e.g., represented by $D_y$), different second distances (e.g., represented by $D_x$), different lattice ratios, different geometry ratios, a combination thereof, and/or the like. For instance, FIG. 4 shows that the pillar 102 gap (e.g., represented by G) can narrow with each sequential stage of the condenser array 100 of the microchannel 400.

As fluid flows through the condenser array 100, it can be manipulated differently by each stage. For example, each stage of the condenser array 100 can have a different pillar gap size (e.g., represented by G), thereby causing a different angle of deflection for four different colloid species, A through D. The size of the colloid species can vary and can be characterized as A>B>C>D. The first stage 402 can displace the largest colloid species, A, against the collection wall 304, where it can be isolated by a side channel or outlet. Each additional stage can have a modified geometry ratio (e.g., characterized by $D_0/D_y$), which can increase the angle of deflection for the next largest colloid, allowing a systematic condensation and isolation of all colloidal species. In other words: the second stage 404 can displace the second largest colloid species, B, against the collection wall 304, where it can be isolated by another side channel or outlet; the third stage 406 can displace the third largest colloid species, C, against the collection wall 304, where it can be isolated by another side channel or outlet; and/or the fourth stage 408 can displace the fourth largest colloid species, D, against the collection wall 304, where it can be isolated by another side channel or outlet. As shown in FIG. 4, the third region 410 can depict an exemplary flow path of the largest colloid species A, the fourth region 412 can depict an exemplary flow path of the second largest colloid species B, the fifth region 414 can depict an exemplary flow path of the third largest colloid species C, and/or the sixth region 416 can depict an exemplary flow path of the fourth largest colloid species D. An embodiment in which the condenser array 100 comprises the exemplified staged design described herein can allow multiple colloid specie to be purified from a single fluid stream based on size.

Figure 5A:
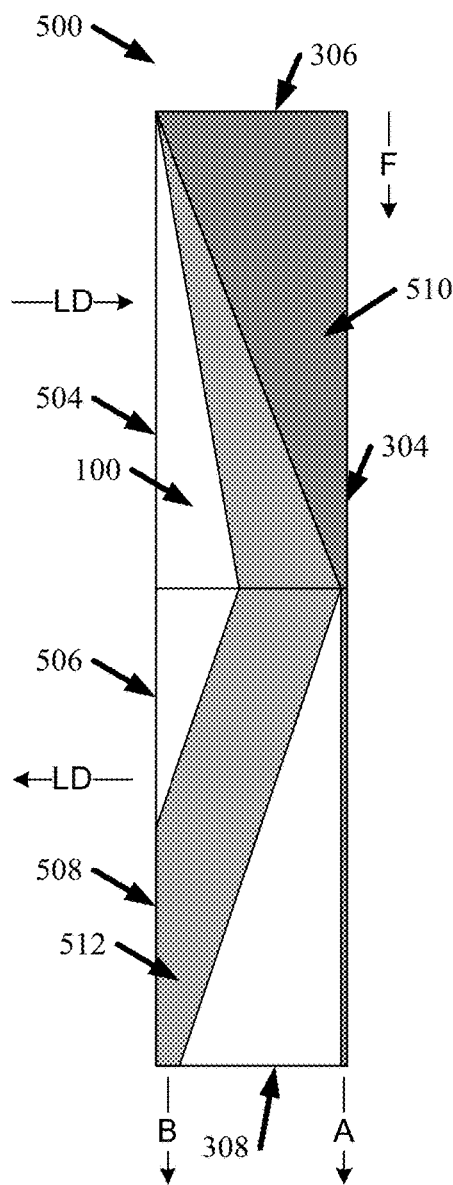
FIG. 5A illustrates a diagram of an example, non-limiting condenser array that can comprise a plurality of states with varying displacement directions in accordance with one or more embodiments described herein.
Figure 5B:
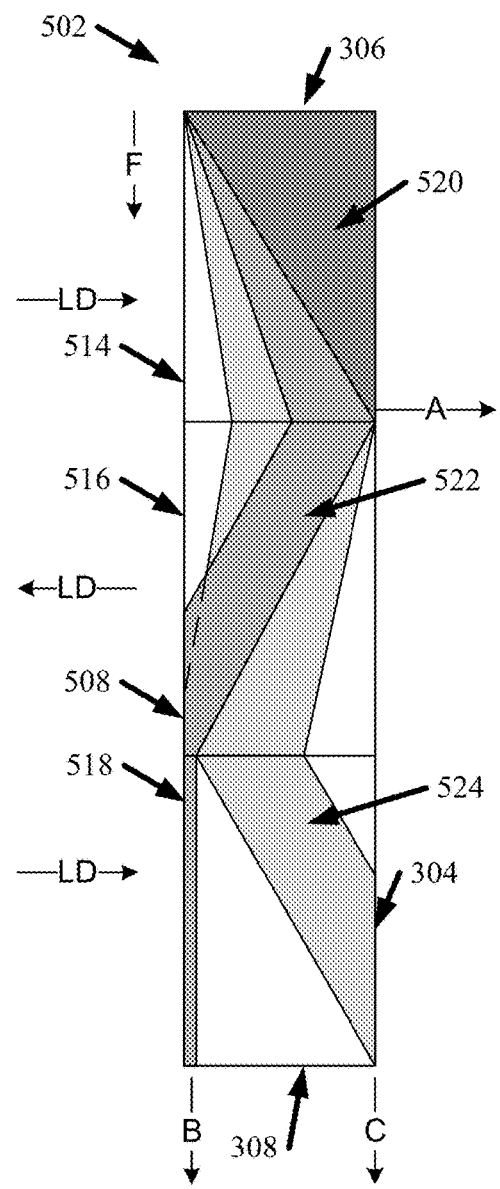
FIG. 5B illustrates a diagram of an example, non-limiting condenser array that can comprise a plurality of states with varying displacement directions in accordance with one or more embodiments described herein.

FIGS. 5A and 5B can illustrate diagrams of example, non-limiting microchannels 500, 502 that can comprise condenser arrays 100 that can facilitate displacement of one or more particles (e.g., colloids) in multiple lateral displacement directions in accordance with one or more embodiments described herein. Repetitive description of like elements employed in other embodiments described herein is omitted for sake of brevity. The condenser arrays 100 of microchannel 500 and microchannel 502 can comprise a plurality of stages, which can exhibit multiple lateral displacement directions.

Regarding FIG. 5A, a fluid can flow through microchannel 500 (e.g., in a fluid direction indicated by arrow F) from an inlet side 306 to an outlet side 308. As the fluid flows through microchannel 500 the condenser array 100 can displace respective particle (e.g., colloid) species within the fluid in varying lateral displacement directions (e.g., as indicated by arrows LD). For example, a fifth stage 504 of the condenser array 100 can displace the fluid in a first lateral displacement direction (e.g., to the right in FIG. 5A as indicated by arrow LD). Thereby a first colloid species (e.g., A) can be displaced along the collection wall 304 and form a concentrated stream that can exit the condenser array 100 by the outlet side 308 (e.g., as depicted by arrow A). Also, a sixth stage 506 of the condenser array 100 can displace the fluid in a second lateral displacement direction (e.g., to the left in FIG. 5A as indicated by arrow LD). Thereby a second colloid species (e.g., B) can be displaced along a second collection wall 508 and form another concentrated stream that can exit the condenser array 100 by the outlet side 308 (e.g., as depicted by arrow B). The seventh region 510 can depict an exemplary flow path of the first colloid species (e.g., A) through the condenser array 100. The eighth region 512 can depict an exemplary flow path of the second colloid species (e.g., B) through the condenser array 100.

Regarding FIG. 5B, a fluid can flow through microchannel 502 (e.g., in a fluid direction indicated by arrow F) from an inlet side 306 to an outlet side 308. As the fluid flows through microchannel 502 the condenser array 100 can displace respective particle (e.g., colloid) species within the fluid in varying lateral displacement directions (e.g., as indicated by arrows LD). For example, a seventh stage 514 of the condenser array 100 can displace the fluid in a first lateral displacement direction (e.g., to the right in FIG. 5B as indicated by arrow LD). Thereby a first colloid species (e.g., A) can be displaced along the collection wall 304 and form a concentrated stream that can exit the condenser array 100 by a side outlet (e.g., as depicted by arrow A). Also, an eighth stage 516 of the condenser array 100 can displace the fluid in a second lateral displacement direction (e.g., to the left in FIG. 5A as indicated by arrow LD). Thereby a second colloid species (e.g., B) can be displaced along a second collection wall 508 and form another concentrated stream that can exit the condenser array 100 by the outlet side 308 (e.g., as depicted by arrow B). Further, a ninth stage 518 of the condenser array 100 can displace the fluid in the first lateral displacement direction again. Thereby a third colloid species (e.g., C) can be displaced along the collection wall 304 and form another concentrated stream that can exit the condenser array 100 by the outlet side 308 (e.g., as depicted by arrow C). The ninth region 520 can depict an exemplary flow path of the first colloid species (e.g., A) through the condenser array 100. The tenth region 522 can depict an exemplary flow path of the second colloid species (e.g., B) through the condenser array 100. The eleventh region 524 can depict an exemplary flow path of the second colloid species (e.g., C) through the condenser array 100.

Thus, FIGS. 5A and 5B show condenser arrays 100, in which the lateral direction of each sequential stage can be varied to manipulate particle population(s) by size. In the two-stage embodiment shown in FIG. 5A, a two species jet of colloids can be manipulated such that the larger species (e.g., A) can be condensed and isolated on one side of the channel (e.g., collection wall 304), and the second species (e.g., B) can be deflected and condensed on the opposite side (e.g., second collection wall 508). This spatial separation can allow the two jets of particles to then be isolated at the outlet (e.g., outlet side 308) of the condenser array 100, to effect high resolution separation. The three-stage design shown in FIG. 5B can effect the same separation on a 3 species particle (e.g., colloidal) jet. One of ordinary skill in the art will appreciate that any number of stages, each of varying geometry and length, can be sequentially run to effect different deflections and isolations of particles. One or more embodiments in which the condenser array 100 facilitates multiple lateral displacement directions can have the advantage of separating and/or purifying various particles (e.g., colloids) based on size.

Figure 6:
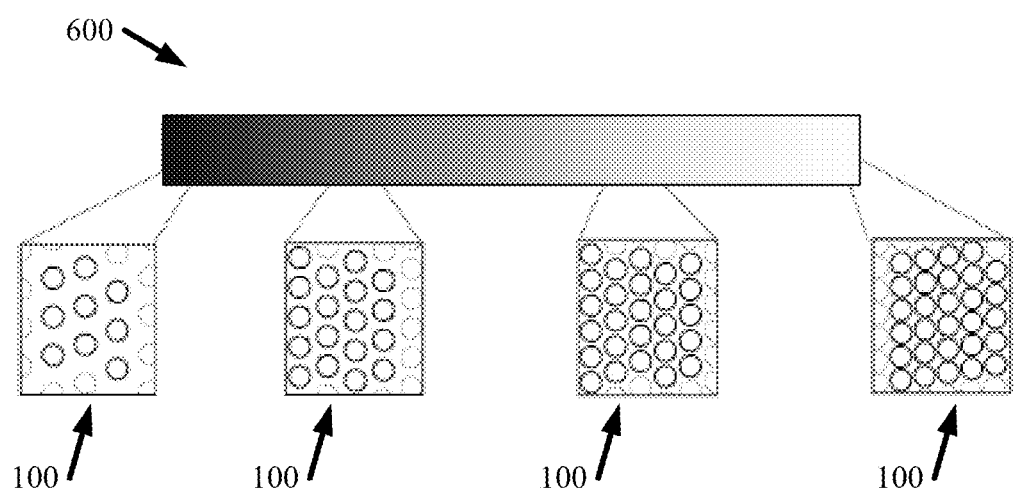
FIG. 6 illustrates a diagram of an example, non-limiting condenser array that can comprise a pillar gap gradient in accordance with one or more embodiments described herein.

FIG. 6 illustrates a diagram of an example, non-limiting microchannel 600 that can comprise a multi-stage condenser array 100 in accordance with one or more embodiments described herein. Repetitive description of like elements employed in other embodiments described herein is omitted for sake of brevity. As shown in FIG. 6, various shades of a condenser array 100 comprising the microchannel 600 can represent respective condenser array 100 geometries. For example, FIG. 6 depicts expanded views of four exemplary stages of the condenser array 100, having respective geometries (e.g., varying pillar 102 gaps G). FIG. 6 shows a staged condenser array 100, in which the transition between different geometries can be a gradual change between each pillar 102 row 107. An embodiment in which the condenser array 100 comprises the shown gradient change in the particle deflection, as opposed to an abrupt transition in the staged design, can be used for mixtures of particles in which the size difference is a continuous distribution (dispersion) and therefore requires a continuous fractionation to effect separation.

Figure 7:
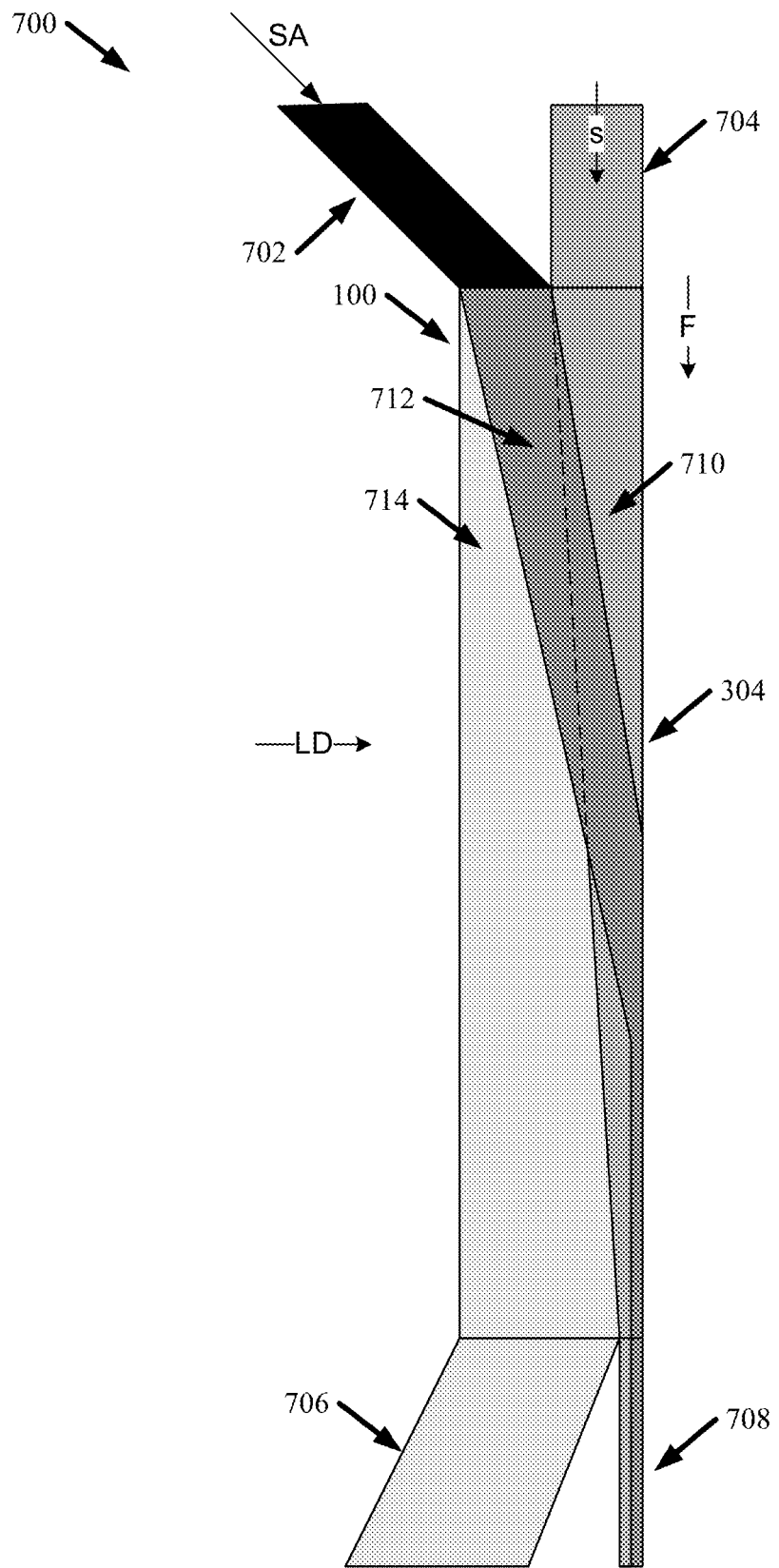
FIG. 7 illustrates a diagram of an example, non-limiting condenser array that can displace one or more particles (e.g., colloids) towards a collection wall to facilitate microfluidic purification in accordance with one or more embodiments described herein.

FIG. 7 illustrates a diagram of an example, non-limiting microchannel 700 that can comprise a wall-focused condenser array 100 and/or facilitate purification of a sample fluid. Repetitive description of like elements employed in other embodiments described herein is omitted for sake of brevity.

The microchannel 700 can comprise a condenser array 100 in fluid communication with one or more sample inlet 702 and/or one or more solvent inlet 704. A sample fluid can flow through the one or more sample inlet 702 (e.g., in a direction indicated by arrow "SA") and into the condenser array 100. Also, a solvent fluid can flow through the one or more solvent inlet 704 (e.g., in a direction indicated by arrow "S") and into the condenser array 100. The sample fluid and the solvent fluid can flow through the condenser array 100 (e.g., in a direction indicated by arrow F) and can exit via one or more contaminant outlets 706 and/or one or more sample outlets 708. As the fluids flow through the condenser array 100, the fluids can be displaced towards in a lateral displacement direction (e.g., in a general direction indicated by arrow LD). Further, one or more samples within the sample fluid can be displaced towards a collection wall 304. Also, the solvent fluid can be displaced towards the collection wall 304. The sample and/or the solvent fluid can collect along the collection wall 304 and/or form a concentrated stream, which can exit the condenser array 100 via the sample outlet 708. In contrast, one or more contaminants within the sample fluid can remain free of the collection wall 304 and exit the condenser array 100 via the contaminant outlet 706. A twelfth region 710 can depict an exemplary flow path of the solvent fluid through the condenser array 100. A thirteenth region 712 can depict an exemplary flow path of the one or more samples through the condenser array 100. Also, a fourteenth region 714 can depict an exemplary flow path of the one or more contaminants through the condenser array 100.

Microchannel 700 can purify colloidal samples with high band pass, such as extracellular vesicles. In this case, purification can be used to imply that one or more colloid species of interest can be isolated from other colloids outside of a certain size range, larger and smaller particles, including salts, small molecules, contaminates, etc., present in the original injected sample stream. This purification can be effected by the simultaneous injection of a pure solvent stream co-axial with the sample stream. The pure solvent stream, its composition selected by the user depending the application requirements, can generate a clean solution space into which particles can be deflected, effecting the purification.

Figure 8:
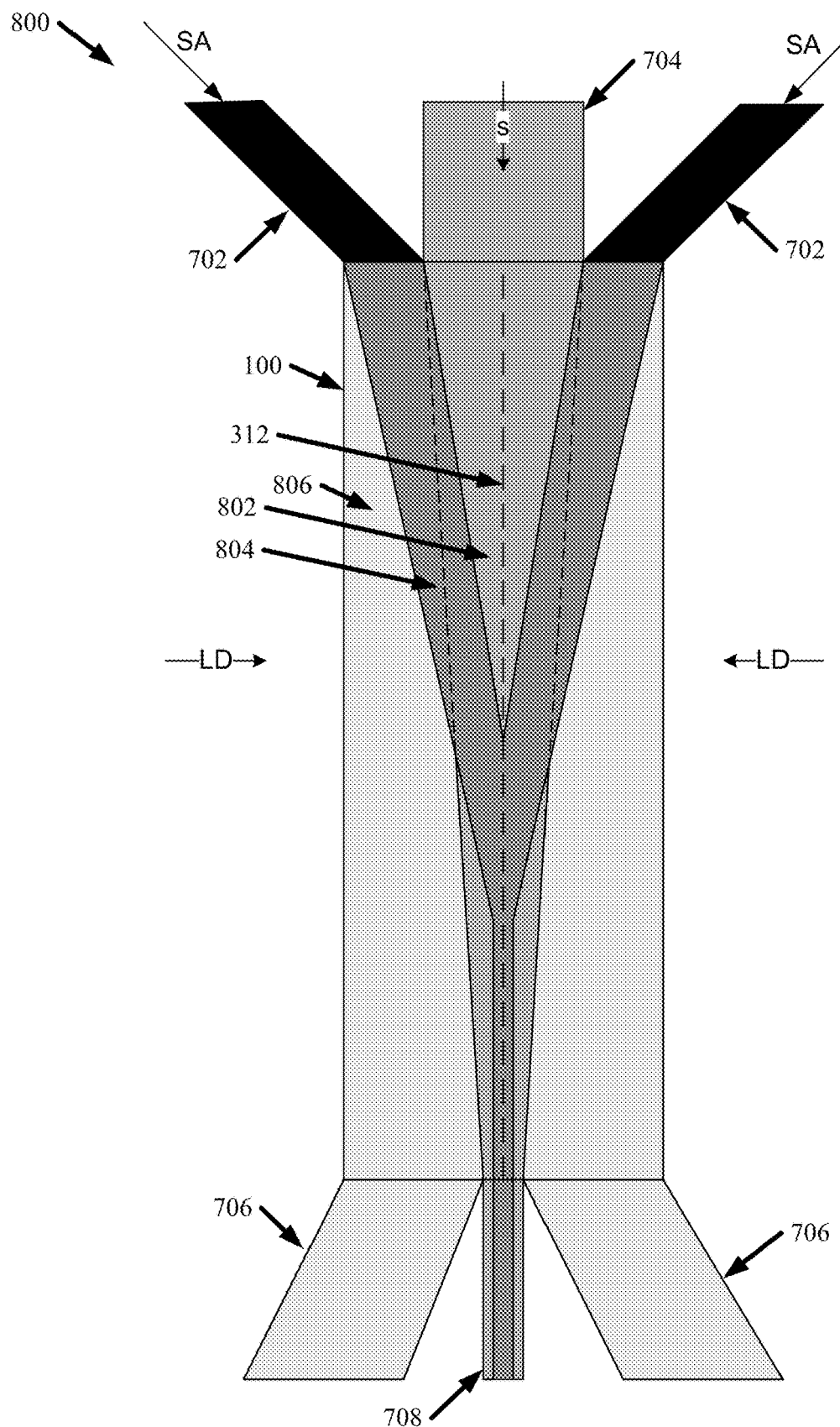
FIG. 8 illustrates a diagram of an example, non-limiting condenser array that can displace one or more particles (e.g., colloids) towards a collection channel to facilitate microfluidic purification in accordance with one or more embodiments described herein.

FIG. 8 illustrates a diagram of an example, non-limiting microchannel 800 that can comprise a channel-focused condenser array 100 and/or facilitate purification of a sample fluid. Repetitive description of like elements employed in other embodiments described herein is omitted for sake of brevity.

The microchannel 800 can comprise a condenser array 100 in fluid communication with one or more sample inlets 702 and/or one or more solvent inlets 704. A sample fluid can flow through the one or more sample inlet 702 (e.g., in a direction indicated by arrows SA) and into the condenser array 100. Also, a solvent fluid can flow through the one or more solvent inlet 704 (e.g., in a direction indicated by arrow S) and into the condenser array 100. The sample fluid and the solvent fluid can flow through the condenser array 100 (e.g., in a direction indicated by arrow F) and can exit via one or more contaminant outlets 706 and/or one or more sample outlets 708. As the fluids flow through the condenser array 100, the fluids can be displaced towards in multiple lateral displacement directions (e.g., in directions indicated by arrows LD). Further, one or more samples within the sample fluid can be displaced towards a collection channel 312. Also, the solvent fluid can be displaced towards the collection channel 312. The sample and/or the solvent fluid can collect along the collection channel 312 and/or form a concentrated stream, which can exit the condenser array 100 via the sample outlet 708. In contrast, one or more contaminants within the sample fluid can remain free of the collection channel 312 and exit the condenser array 100 via one or more of the contaminant outlets 706. A fifteenth region 802 can depict an exemplary flow path of the solvent fluid through the condenser array 100. A sixteenth region 804 can depict an exemplary flow path of the one or more samples through the condenser array 100. Also, a seventeenth region 806 can depict an exemplary flow path of the one or more contaminants through the condenser array 100.

In one or more embodiments, the various embodiments regarding the condenser array 100 can be utilized to design microchannels that can facilitate sample purification. For example, while FIGS. 7 and 8 show a single solvent inlet 704, microchannels comprising a plurality of solvent inlets 704 in fluid communication with a condenser array 100 are also envisaged. Additionally, microchannels 700 and 800 can be modified to comprise multi-stage arrangements (e.g., in accordance with one or more embodiments shown in FIGS. 4-6) to purify and/or collect multiple particle (e.g., colloid) size ranges. For example, the condenser array 100 described herein (e.g., the condenser array 100 of FIGS. 7 and/or 8) can comprise a multi-wall-focus (e.g., a double wall-focus) configuration and/or a multi-channel-focus (e.g., a double channel-focus) configuration.

Figure 9:
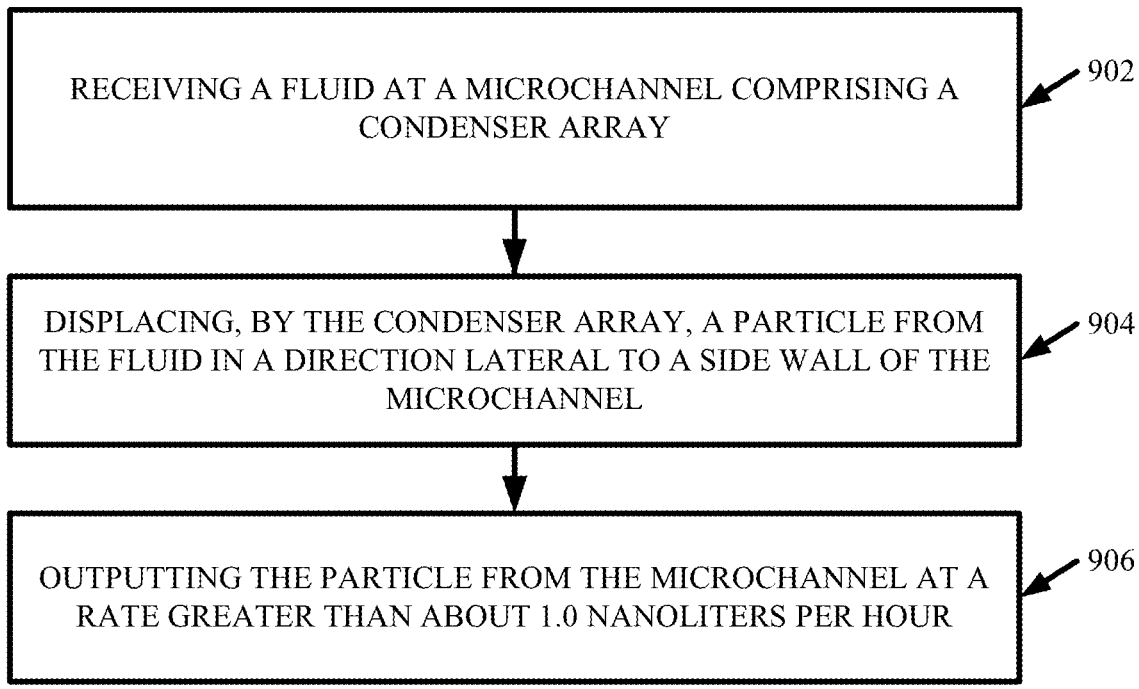
FIG. 9 illustrates a flow diagram of an example, non-limiting method that can facilitate microfluidic separation via one or more condenser arrays in accordance with one or more embodiments described herein.

FIG. 9 illustrates a flow diagram of an example, non-limiting method 900 that can comprise separating one or more particles (e.g., colloids) from a fluid using a condenser array 100. Repetitive description of like elements employed in other embodiments described herein is omitted for sake of brevity.

At 902, the method 900 can comprise receiving a fluid at a microchannel 103, 300, 302, 400, 500, 502, 600, 700, 800 comprising one or more condenser arrays 100. For example, the fluid can be received at the microchannel 103, 300, 302, 400, 500, 502, 600, 700, 800 via one or more inlets (e.g., an inlet side 306). The fluid can be supplied to the microchannel 103, 300, 302, 400, 500, 502, 600, 700, 800 at a steady rate (e.g., via a pressure system).

At 904, the method 900 can comprise displacing, by the condenser array 100, one or more particles (e.g., colloids) from the fluid in a direction lateral (e.g., a lateral displacement direction) to a side wall of the microchannel 103, 300, 302, 400, 500, 502, 600, 700, 800. Further, at 906 the method 900 can comprise outputting (e.g., via an outlet such as side outlet 308) the one or more particles from the microchannel 103, 300, 302, 400, 500, 502, 600, 700, 800 at a rate greater than about 1.0 nL/hr. For example, the one or more particles can be outputted at 906 at a rate greater than or equal to 1.0 nL/hr and less than or equal to 60 mL/hr.

Figure 10:
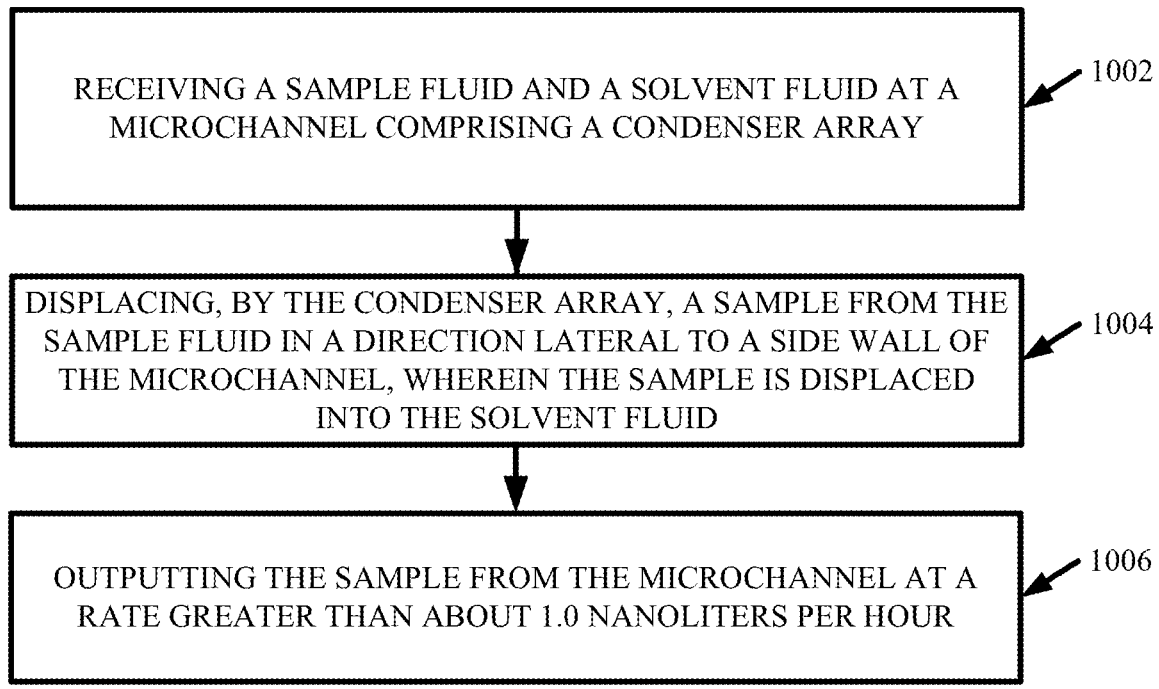
FIG. 10 illustrates a flow diagram of an example, non-limiting method that can facilitate microfluidic purification via one or more condenser arrays in accordance with one or more embodiments described herein.

FIG. 10 illustrates a flow diagram of an example, non-limiting method 1000 that can comprise purifying a sample fluid using a condenser array 100. Repetitive description of like elements employed in other embodiments described herein is omitted for sake of brevity.

At 1002, the method 1000 can comprise receiving a sample fluid and a solvent fluid at a microchannel 103, 300, 302, 400, 500, 502, 600, 700, 800 comprising one or more condenser arrays 100. For example, the sample fluid and/or the solvent fluid can be received at the microchannel 103, 300, 302, 400, 500, 502, 600, 700, 800 via one or more inlets (e.g., an inlet side 306, sample inlet 702, and/or solvent inlet 704). The sample fluid and/or the solvent fluid can be supplied to the microchannel 103, 300, 302, 400, 500, 502, 600, 700, 800 at a steady rate (e.g., via a pressure system).

At 1004, the method 1000 can comprise displacing, by the condenser array 100, a sample from the sample fluid in a direction (e.g., a lateral displacement direction) lateral to a side wall of the microchannel 103, 300, 302, 400, 500, 502, 600, 700, 800. Further, the sample can be displaced into the solvent fluid by the condenser array 100. Moreover, at 906 the method 900 can comprise outputting (e.g., via an outlet such as side outlet 308, a contaminant outlet 706, and/or a sample outlet 708) the one or more particles from the microchannel 103, 300, 302, 400, 500, 502, 600, 700, 800 at a rate greater than about 1.0 nL/hr. For example, the one or more particles can be outputted at 906 at a rate greater than or equal to 1.0 nL/hr and less than or equal to 60 mL/hr.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
a condenser array comprising a plurality of pillars forming a microchannel, the plurality of pillars arranged in a plurality of columns, wherein a pillar gap greater than or equal to 0.5 micrometers is located between a first pillar of the plurality of pillars in a first column of the plurality of columns and a second pillar of the plurality of pillars in the first column, and wherein the first pillar is adjacent to the second pillar, and wherein a first set of the pillars in a first stage of the microchannel are configured to laterally displace a fluid flowing through the condenser array towards a first side of the microchannel, and a second set of the pillars in a second stage of the microchannel are configured to laterally displace the fluid flowing through the condenser array towards a second side of the microchannel, and a third set of the pillars in a third stage of the microchannel are configured to laterally displace the fluid flowing through the condenser array towards the first side of the microchannel, wherein the second side is opposite to the first side, the second stage is after the first stage in a direction of flow of the microchannel, and the third stage is after the second stage in the direction of flow of the microchannel.

2. The apparatus of claim 1, wherein the pillar gap is a first pillar gap that is part of the first set of the pillars, and the second set of the pillars comprise a second pillar gap that is different from the first pillar gap.

3. The apparatus of claim 2, wherein the third set of the pillars comprise a third pillar gap that is different from the first pillar gap and the second pillar gap.

4. The apparatus of claim 3, wherein the first pillar gap is larger than the second pillar gap.

5. The apparatus of claim 4, wherein the second pillar gap is larger than the third pillar gap.

6. The apparatus of claim 1, wherein the plurality of pillars define a lattice.

7. The apparatus of claim 6, wherein a first ratio is less than or equal to a first predefined value, the first ratio characterized by $D_x/D_y$, wherein $D_x$ represents a first distance across the lattice in a first direction, wherein $D_y$ represents a second distance across the lattice in a second direction, and wherein the first direction is orthogonal to the second direction.

8. The apparatus of claim 7, wherein a second ratio is greater than a second predefined value, the second ratio characterized by $D_0/D_y$, wherein $D_0$ represents a diameter of the plurality of pillars.

9. The apparatus of claim 8, wherein the first predefined value is 1.0, and wherein the second predefined value is 0.5.

10. The apparatus of claim 8, wherein the plurality of pillars are further arranged in a plurality of rows, and wherein a boundary of the lattice is defined by a shape of the plurality of pillars, respective center lines of the plurality of columns, and respective center lines of the plurality of rows.

11. The apparatus of claim 10, wherein the plurality of pillars define a plurality of lattices, and wherein the lattice is comprised within the plurality of lattices.

12. The apparatus of claim 11, wherein the lattice is part of the first set of the pillars and displaces the fluid in a first lateral displacement direction.

13. The apparatus of claim 12, wherein a second lattice of the plurality of lattices that is part of the second set of the pillars displaces the fluid in a second lateral displacement direction.

14. The apparatus of claim 1, wherein the first stage of the microchannel is configured to condense a first colloid species on the first side of the microchannel in the first stage, wherein a size of the first colloid species is greater than a first size.

15. The apparatus of claim 14, wherein the second stage of the microchannel is configured to condense a second colloid species on the second side of the microchannel in the second stage, wherein a size of the second colloid species is greater than a second size and less than the first size.

16. The apparatus of claim 15, wherein the third stage of the microchannel is configured to condense a third colloid species on the first side of the microchannel in the third stage, wherein a size of the second colloid species is greater than a third size and less than the second size.

17. The apparatus of claim 1, wherein the first stage of the microchannel comprises an outlet on the first side.

18. The apparatus of claim 17, wherein the outlet on the first side is within a defined distance of the second stage.

19. The apparatus of claim 1, wherein the first stage of the microchannel comprises an inlet at a first end of the first stage opposite from a second end of the first stage adjacent to the second stage.

20. The apparatus of claim 1, wherein the third stage of the microchannel comprises an outlet at a first end of the third stage opposite from a second end of the third stage adjacent to the second stage.

* * * * *